(12) United States Patent
Wang et al.

(10) Patent No.: US 9,131,473 B2
(45) Date of Patent: Sep. 8, 2015

(54) METHOD, DEVICE, AND COMMUNICATION SYSTEM FOR ESTABLISHING CONNECTION WITH NETWORK MANAGEMENT SYSTEM

(71) Applicant: Huawei Technologies Co., Ltd., Shenzhen, Guangdong (CN)

(72) Inventors: Ke Wang, Shanghai (CN); Yan Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/036,943

(22) Filed: Sep. 25, 2013

(65) Prior Publication Data

US 2014/0026207 A1    Jan. 23, 2014

Related U.S. Application Data

(63) Continuation of application No. PCT/CN2012/072831, filed on Mar. 22, 2012.

(30) Foreign Application Priority Data

Mar. 29, 2011    (CN) .......................... 2011 1 0077281

(51) Int. Cl.
*H04L 29/06*    (2006.01)
*H04W 76/02*    (2009.01)
(Continued)

(52) U.S. Cl.
CPC ............... *H04W 76/02* (2013.01); *H04L 41/28* (2013.01); *H04L 61/2015* (2013.01);
(Continued)

(58) Field of Classification Search
CPC ...................................................... H04L 41/28

USPC ............................................ 380/247; 713/182
See application file for complete search history.

(56) References Cited

U.S. PATENT DOCUMENTS

2003/0214955 A1    11/2003    Kim
2008/0261563 A1    10/2008    Drevon et al.
(Continued)

FOREIGN PATENT DOCUMENTS

CN    101291464 A    10/2008
CN    101827451 A    9/2010
(Continued)

OTHER PUBLICATIONS

Pabst et al. "Relay-Based Deployment Concepts for Wireless and Mobile Broadband Radio". IEEE. 2004.*
(Continued)

*Primary Examiner* — Mohammad L Rahman
(74) *Attorney, Agent, or Firm* — Leydig, Voit & Mayer, Ltd.

(57) ABSTRACT

The present disclosure relates to the field of communications technologies and discloses a method, a device, and a communication system for establishing a connection with a network management system. The method includes: obtaining, by a relay node, a first IP address of the relay node; obtaining, by the relay node, an IP address of a security gateway by using the first IP address of the relay node; establishing, by the relay node, an IP security tunnel with the security gateway according to the IP address of the security gateway; obtaining, by the relay node, a second IP address of the relay node and an IP address of the network management system through the IP security tunnel; and establishing, by the relay node, a connection with the network management system by using the second IP address of the relay node and the IP address of the network management system.

11 Claims, 5 Drawing Sheets

(51) Int. Cl.
  *H04L 12/24* (2006.01)
  *H04W 24/02* (2009.01)
  *H04L 29/12* (2006.01)
  *H04W 88/08* (2009.01)

(52) U.S. Cl.
  CPC .............. *H04L 63/02* (2013.01); *H04W 24/02* (2013.01); *H04L 61/1511* (2013.01); *H04L 63/0272* (2013.01); *H04L 63/164* (2013.01); *H04W 88/085* (2013.01)

(56) References Cited

U.S. PATENT DOCUMENTS

| | | | |
|---|---|---|---|
| 2010/0074117 A1 | 3/2010 | Du et al. | |
| 2010/0260109 A1* | 10/2010 | Ulupinar et al. | 370/328 |
| 2011/0038480 A1* | 2/2011 | Lin | 380/270 |
| 2011/0185397 A1* | 7/2011 | Escott et al. | 726/3 |
| 2011/0310791 A1* | 12/2011 | Prakash et al. | 370/315 |
| 2011/0317617 A1 | 12/2011 | Sun et al. | |
| 2012/0051283 A1 | 3/2012 | Takahashi et al. | |
| 2012/0140701 A1 | 6/2012 | Huang | |
| 2012/0297474 A1* | 11/2012 | Zhang et al. | 726/10 |
| 2014/0094159 A1* | 4/2014 | Raleigh et al. | 455/418 |

FOREIGN PATENT DOCUMENTS

| | | |
|---|---|---|
| CN | 101841934 A | 9/2010 |
| CN | 101964970 A | 2/2011 |
| CN | 101977378 A | 2/2011 |
| EP | 2254320 A1 | 11/2010 |
| WO | WO 2010057130 A2 | 5/2010 |
| WO | WO 2010150661 A1 | 12/2010 |
| WO | WO 2011020404 A1 | 2/2011 |

OTHER PUBLICATIONS

International Search Report in corresponding PCT Patent Application No. PCT/CN2012/072831 (Jul. 5, 2012).

Patel et al.,"Dynamic Host Configuration Protocol (DHCPv4) Configuration of IPsec Tunnel Mode," Network Working Group, Request for Comments: 3456, pp. 1-18, Internet Society, Reston, Virginia (Jan. 2003).

* cited by examiner

METHOD, DEVICE, AND COMMUNICATION SYSTEM FOR ESTABLISHING CONNECTION WITH NETWORK MANAGEMENT SYSTEM

CROSS-REFERENCE TO RELATED APPLICATIONS

This application is a continuation of International Patent Application No. PCT/CN2012/072831, filed on Mar. 22, 2012, which claims priority to Chinese Patent Application No. 201110077281.7, filed on Mar. 29, 2011, both of which are hereby incorporated by reference in their entireties.

TECHNICAL FIELD

The present disclosure relates to the field of communications technologies and, in particular, to a method, a device, and a communication system for establishing a connection with a network management system.

BACKGROUND

In the process of broadband and mobilization development of a network, the 3rd Generation Partnership Program (3rd Generation Partnership Program, 3GPP) organization introduces the Long Term Evolution (Long Term Evolution, LTE) solution, namely Evolved Universal Mobile Telecommunication System (UMTS) Territorial Radio Access Network (Evolved Universal Mobile Telecommunication System Territorial Radio Access Network, E-UTRAN), for a mobile access network, and introduces the System Architecture Evolution (System Architecture Evolution, SAE) scheme, namely Evolved Packet Core (Evolved Packet Core, EPC), for a mobile core network.

A conventional cellular network is a base-station-centered star topology network and uses centralized control. Therefore, a problem about relay node access does not exist in an access network. In an LTE system, a relay node (Relay Node, RN) is introduced in an access network to extend the network coverage, increase network capacity, and improve flexibility of network deployment. In the process of a relay node accessing the network, the relay node needs to establish a connection with a network management system, such as an operation and management (Operation and Management, OAM) system, and then download a configuration parameter from the network management system to implement the access and configuration of the relay node. Meanwhile, the security of the connection between the relay node and the network management system and the security of the connection establishing process need to be further ensured. However, in the prior art, there is no implementation scheme about how to establish a connection between a relay node and a network management system.

SUMMARY

To resolve the foregoing problem existing in the prior art, embodiments of the present disclosure provide a method, a device, and a communication system for establishing a connection with a network management system, so as to implement a connection between a relay node and a network management system and ensure the security of the relay node and a correct network access.

For this purpose, an embodiment of the present disclosure provides a method for establishing a connection with a network management system, including: obtaining, by a relay node, a first IP address of the relay node; obtaining, by the relay node, an IP address of a security gateway by using the first IP address of the relay node; establishing, by the relay node, an IP security tunnel with the security gateway according to the IP address of the security gateway; obtaining, by the relay node, a second IP address of the relay node and an IP address of the network management system through the IP security tunnel; and establishing, by the relay node, a connection with the network management system by using the second IP address of the relay node and the IP address of the network management system.

An embodiment of the present disclosure further provides a method for establishing a packet data network connection for a relay node, including: obtaining, by a mobile management entity MME, subscription data of a relay node when the relay node accesses a network, where the subscription data includes information for instructing selection of a packet data network gateway P-GW for the relay node; and selecting, by the MME, a P-GW for serving the relay node according to the subscription data, so that the P-GW may establish a packet data network (PDN) connection for the relay node.

An embodiment of the present disclosure further provides a relay node, including: a first address obtaining unit, configured to obtain a first IP address of the relay node; a querying unit, configured to obtain an IP address of a security gateway by using the first IP address; a security tunnel establishing unit, configured to establish an IP security tunnel with the security gateway according to the IP address of the security gateway; a second address obtaining unit, configured to obtain a second IP address of the relay node and an IP address of a network management system through the IP security tunnel; and a connection establishing unit, configured to establish a connection with the network management system by using the second IP address of the relay node and the IP address of the network management system.

An embodiment of the present disclosure further provides a mobile management network element, including: a subscription data obtaining unit, configured to obtain subscription data of a relay node when the relay node accesses a network, where the subscription data includes information for instructing selection of a packet data network gateway P-GW for the relay node; and a gateway selection unit, configured to select a P-GW for serving the relay node according to the subscription data, so that the P-GW establishes a packet data network PDN connection for the relay node.

An embodiment of the present disclosure further provides a communication system, including: a network management system and a relay node, where the relay node is configured to establish a connection with the network management system.

In the method, the device, and the communication system for establishing a connection with a network management system provided by the embodiments of the present disclosure, the relay node obtains the first IP address of the relay node by using the PDN connection; obtains the IP address of the security gateway by using the first IP address of the relay node; establishes the IP security tunnel with the security gateway according to the IP address of the security gateway; obtains the second IP address of the relay node and the IP address of the network management system through the IP security tunnel; and establishes the connection with the network management system by using the second IP address of the relay node and the IP address of the network management system. Consequently, during the process of accessing a network, the relay node implements a connection with the network management system, and the security of the connection and the processing of establishing the connection is ensured. This further ensures that the relay node is capable of downloading necessary configuration parameters from the network management system to perform access and configuration of the relay node.

BRIEF DESCRIPTION OF DRAWINGS

To illustrate the technical solutions in the embodiments of the present disclosure or in the prior art more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

In order to make persons skilled in the art understand the solutions of the embodiments of the present disclosure more clearly, the embodiments of the present disclosure are further described in detail in the following with reference to the accompanying drawings and implementation manners.

Figure 1:
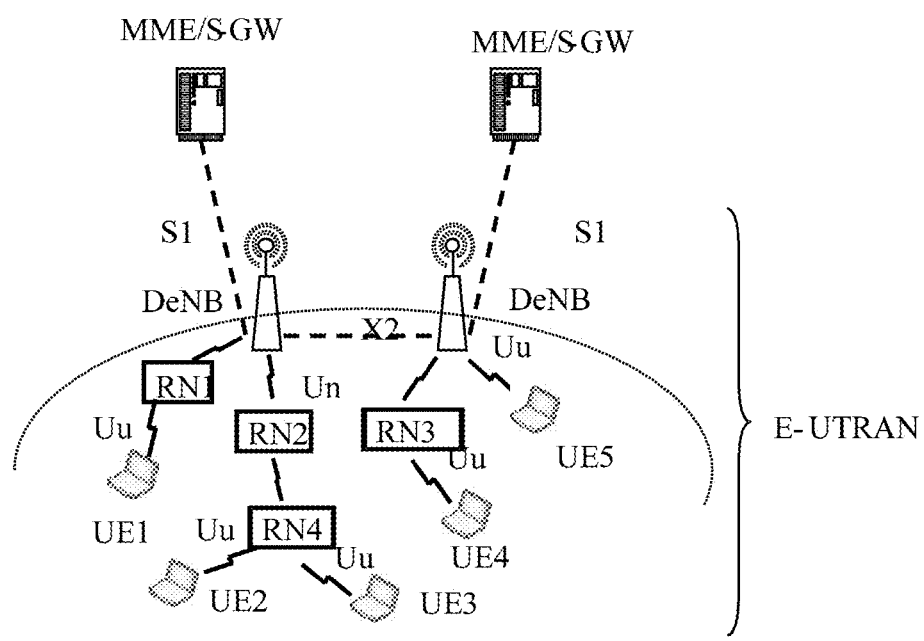
FIG. 1 is a schematic diagram of a network architecture after a relay node is introduced in an E-UTRAN network according to an embodiment of the present disclosure.

In an E-UTRAN network, after the introduction of a relay node, the network architecture is shown in FIG. 1.

In the network architecture, a relay node (such as RN1, RN2, RN3, and RN4 in FIG. 1) accesses the network through a Donor base station (Donor eNB, DeNB), and the relay node is similar to a user equipment (User Equipment, UE). The relay node also establishes a connection with a mobile management entity (Mobile Management Entity, MME) and a service gateway (S-GW) during the network access process of the relay node. Meanwhile, as a network element device, the relay node further establishes a connection with a network management system and download configuration parameters, so as to enable relevant functions of the relay node so that the user equipment (such as UE1, UE2, UE3, UE4, and UE5 in FIG. 1) may access the network.

To establish connectivity with the network management system, the relay node establishes a PDN (packet data network) connection first to establish basic IP (Internet Protocol) connectivity between the relay node and a core network. The PDN connection is associated with a specific packet data network gateway (PDN Gateway, P-GW). That is, the user equipment performs data exchange with the packet data network PDN through the P-GW. Different from the process of establishing a PDN connection for a common user equipment, establishing the PDN connection by the relay node is used to provide a connection between the relay node and the network management system and a connection between the relay node and a network where the network management system is located. The network management system and the network where the network management system is located are possessed by an operator and are protected for security. To ensure the IP accessibility between the relay node and the network management system, a P-GW is specified. That is, when performing selection of a P-GW during the process of establishing a PDN connection, the MME selects a P-GW that is capable of supporting the IP accessibility between the relay node and the network where the network management system is located. Meanwhile, when establishing a session, the P-GW also performs a corresponding processing operation according to a network management service type specified by the MME.

In a network access process of a relay node, the following two phases are included.

Phase 1: In this phase, the relay node is used as a UE to access a network, and the relay node may access any base station which may be a common evolved base station (Evolved Node B, eNB) or a Donor base station (Donor eNB, DeNB). In this phase, the relay node establishes a connection with a network management system, and then downloads a DeNB cell list and other configuration parameters from the network management system.

Phase 2: After obtaining the DeNB cell list, the relay node selects a DeNB cell from the DeNB cell list and accesses the cell. In this phase, the relay node accesses a DeNB and the DeNB selects for the relay node an MME that is capable of supporting relay. In this phase, the relay node also keeps or establishes connectivity with the network management system.

In phase 1, when the relay node accesses the network, the MME considers the relay node as a UE. In the network access process of a UE defined by present standards, the UE establishes a PDN connection to a P-GW, and obtains, through the PDN connection, the IP connectivity for communicating with a specified PDN. Therefore, the MME needs to select a P-GW for serving the UE. In the prior art, the principle of selecting a P-GW for a UE is as follows: each piece of PDN subscription data includes an access point name (Access Point Name, APN) and a gateway (Gateway, GW) identifier; in general, the MME uses the gateway identifier information to select the P-GW for serving the UE; however, if the gateway identifier information is not included, the MME constructs a corresponding APN-fully qualified domain name (APN-Fully Qualified Domain Name, N-FQDN) according to the APN in the PDN subscription data, and then obtains an address of the P-GW from a domain name server (Domain Name Server, DNS) according to the APN-FQDN.

For the relay node, because the relay node establishes IP connectivity with the network where the network management system is located and the P-GW for serving the relay node supports IP accessibility between the relay node and the network where the network management system is located, an existing method for selecting a P-GW for a UE cannot be used to select a P-GW for serving a relay node that accesses a network.

In addition, the relay node further obtains address information of the network management system, and the network management system may be operator-level or equipment-vendor-level. The relay node is capable of establishing a connection with the network management system only after obtaining the information. In addition, to avoid that the information about the network management system is illegally obtained or modified by a third party in the process of establishing a connection between the relay node and the network management system, a relevant mechanism is needed to ensure the secure transmission of the information.

To solve the foregoing problem, in the method, the device, and the network for establishing a connection with a network management system in the embodiments of the present disclosure, a relay node obtains a first IP address of the relay node by using a PDN connection; the relay node obtains an IP address of a security gateway by using the first IP address of the relay node; the relay node establishes an IP security tunnel with the security gateway according to the IP address of the security gateway; the relay node obtains a second IP address of the relay node and an IP address of the network management system through the IP security tunnel; and the relay node establishes a connection with the network management system by using the second IP address of the relay node and the IP address of the network management system. Because it is on a protected IP security tunnel that the relay node obtains address information of the network management system, not only is the connection between the relay node and the network management system implemented, but also secure and correct transmission of the information about the network management system is ensured.

Figure 2:
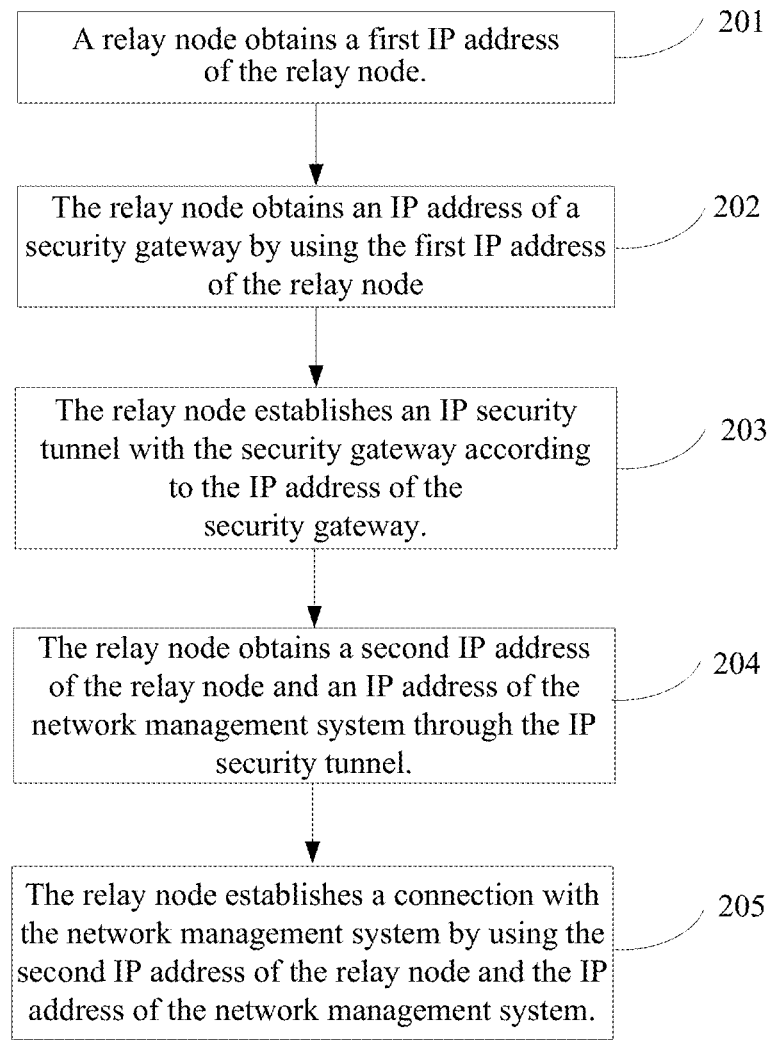
FIG. 2 is a flowchart of a method for establishing a connection with a network management system according to an embodiment of the present disclosure.

FIG. 2 is a flowchart of a method for establishing a connection between a relay node and a network management system according to an embodiment of the present disclosure.

Step 201: A relay node obtains a first IP address of the relay node.

Optionally, the obtaining, by a relay node, a first IP address of the relay node includes: obtaining, by the relay node, the first IP address by using a Dynamic Hosting Configuration Protocol (Dynamic Hosting Configuration Protocol, DHCP) process. For example, after establishing a PDN connection, the relay node obtains its own IP address through a DHCP process, namely, the first IP address of the relay node. For the specific DHCP process, reference may be made to the prior art, which is not described herein again. Alternatively, the relay node obtains the first IP address of the relay node through a process of establishing a PDN connection. For example, in the process of establishing the PDN connection, a P-GW directly assigns an IP address to the relay node, namely, the first IP address of the relay node.

Step 202: The relay node obtains an IP address of a security gateway by using the first IP address of the relay node.

Optionally, the relay node may make a query to the DNS by using an FQDN (Fully Qualified Domain Name) that includes information about the network management system and obtain the IP address of the security gateway. For example, in a specific implementation process, by sending an FQDN that includes information about the network management system to the DNS to make a query, the relay node obtains the IP address of the security gateway fed back by the DNS.

The network management system may be any one or more of the following identification information: a device identifier of the relay node, a device manufacturer identifier of the relay node, an operator identifier, and a network management system identifier, where the device identifier of the relay node may be the hardware address, the hardware number, the device card number, or the device number of the relay node.

For example, the FQDN constructed by the relay node may include one or more of the foregoing identifiers. The multiple identifiers are connected by a ".". Certain non-limitative examples ("< >" and characters in < > are an annotation) are provided in the following:

relay<indicating a relay node>0.123456<indicating the device identifier of the relay node>.XX . . . . ;

relay<indicating a relay node>.AAA<indicating the device manufacturer identifier of the relay node>.XX . . . . ;

oam<indicating a network management system>.AAA<indicating the device manufacturer identifier of the relay node>.XX . . . . ;

oam<indicating a network management system>.BBB<operator identifier>.XX . . . . ; and oam<indicating a network management system>0.123456<indicating the device identifier of the relay node>.XX . . . .

In some implementations, the relay node may further use a DHCP process that includes the information about the network management system to make a query to the DHCP server and obtain the IP address of the security gateway. For example, in one implementation process, by sending a DHCP message that includes the information about the network management system to the DHCP server for making a query, the relay node obtains the IP address of a security gateway fed back by the DHCP server.

The network management system may be any one or more of the following identification information: a device identifier of the relay node, a device manufacturer identifier of the relay node, an operator identifier, and a network management system identifier. The device identifier of the relay node may be the hardware address, the hardware number, the device card number, or the device number of the relay node. In a specific implementation process, the information may be included in a DHCP option (DHCP option) field in a DHCP request message for requesting or querying for specific information from the DHCP server.

In the embodiment of the present disclosure, the network management system may be an operator-level network management system, and correspondingly, the IP address of a security gateway fed back by the DNS or the DHCP server is an IP address of a security gateway that is associated with the network where the operator-level network management system is located; or, the network management system may further be a device-manufacturer-level network management system, and correspondingly, the IP address of a security gateway fed back by the DNS or the DHCP server is an IP address of a security gateway that is associated with the network where the device-manufacturer-level network management system is located.

In some embodiments, the association described herein means that the network where the network management system is located can be accessed only through the security gateway. The network where the network management system is located includes: an actual IP (subnet) network where the network management system is located, or an IP (subnet) network that performs interconnection communication with the actual IP (subnet) network where the network management system is located. The network in the embodiment of the present disclosure is protected by a security gateway.

Step 203: The relay node establishes an IP security tunnel with the security gateway according to the IP address of the security gateway.

The IP address of the security gateway is used for addressing the security gateway. In the process of establishing the IP tunnel between the relay node and the security gateway, the relay node performs authentication with the security gateway and establishes, after the authentication is successful, the IP security tunnel with the security gateway. Certain existing implementation manners may be used for the authentication and the process of establishing the IP security tunnel, which is not limited by the embodiment of the present disclosure.

Step 204: The relay node obtains a second IP address of the relay node and an IP address of the network management system through the IP security tunnel.

In this step, the second IP address of the relay node is an IP address used for network management service transmission for the relay node and may be obtained by initiating a DHCP process to the network where the network management system is located on the IP security tunnel.

The IP address of the network management system may be obtained by using any one of the following three manners:

(1) The relay node initiates a DHCP process to the network where the network management system is located on the IP security tunnel to obtain the IP address of the network management system. That is, the relay node requests the IP address of the network management system from the DHCP server through a DHCP process. To be specific, information about the network management system may be included in a DHCP option (DHCP option) field in a DHCP request message, and the DHCP server directly feeds back the IP address of the network management system.

(2) The DHCP server feeds back an FQDN that indicates the network management system to the relay node, and then the relay node uses the FQDN to make a query to the DNS on the IP security tunnel so as to obtain the IP address of the network management system fed back by the DNS.

(3) The relay node uses an FQDN that includes information about the network management system to make a query to the DNS on the IP security tunnel so as to obtain the IP address of the network management system.

The information about the network management system may be any one or more of the following information: a device identifier of the relay node, a device manufacturer identifier of the relay node, an operator identifier, and a network management system identifier. The device identifier of the relay node may be the hardware address, the hardware number, the device card number, or the device number of the relay node.

The process of constructing an FQDN and the process of making a query to the DNS are similar to the operations in step 202, which are not described herein again.

Step 205: The relay node establishes a connection with the network management system by using the second IP address of the relay node and the IP address of the network management system.

In this step, the established connection is implemented through the IP security tunnel between the relay node and the security gateway, and the establishment of the connection may be initiated by the relay node or by the network management system.

Figure 3:
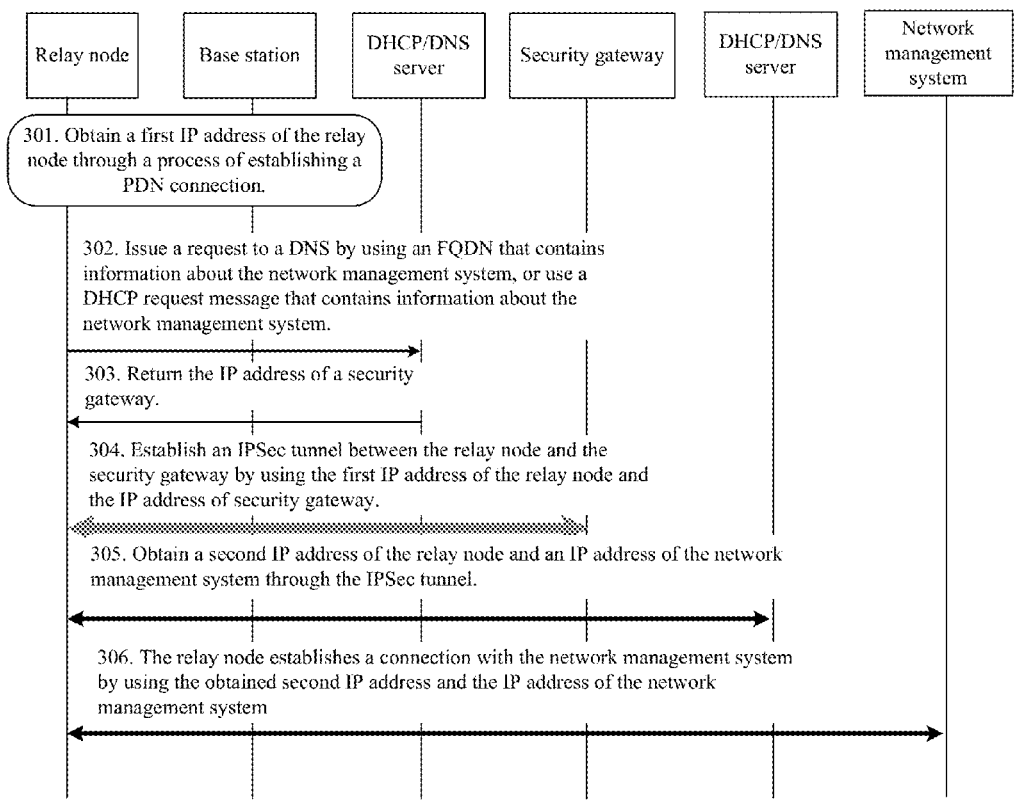
FIG. 3 is a flowchart of message exchange during establishment of a connection between a relay node and a network management system according to an embodiment of the present disclosure.

FIG. 3 is a flowchart of message exchange during establishment of a connection between a relay node and a network management system according to an embodiment of the present disclosure.

Step 301: A relay node obtains a first IP address of the relay node through a process of establishing a PDN connection.

Step 302: The relay node initiates a request to a DNS by using an FQDN that includes information about a network management system, or initiates a request to a DHCP server by using a DHCP request message that includes information about a network management system.

Step 303: The relay node receives an IP address of a security gateway fed back by the DNS or the DHCP server to the relay node.

Step 304: The relay node establishes an IP security (Security Architecture for IP network, IPSec) tunnel between the relay node and the security gateway by using the first IP address of the relay node and the IP address of security gateway.

In this step, the IP address of the security gateway is used for addressing the security gateway. An existing mechanism may be used in the authentication between the relay node and the security gateway and in the process of establishing the IPSec channel.

Step 305: The relay node obtains a second IP address of the relay node and an IP address of the network management system by initiating a DHCP process through the IPSec tunnel.

In this step, the relay node obtains the second IP address of the relay node used for network management service transmission through the DHCP process.

The IP address of the network management system may be obtained by using any one of the following three techniques:

(1) Initiate a DHCP process to the network where the network management system is located on the IP security tunnel so as to obtain the IP address of the network management system, that is, request the IP address of the network management system from the DHCP server through a DHCP process. To be specific, have information that indicates the network management system included in a DHCP option (DHCP option) field in a DHCP request message, and the DHCP server directly feeds back the IP address of the network management system.

(2) The DHCP server feeds back a fully qualified domain name FQDN that indicates the network management system, and the fully qualified domain name FQDN that indicates the network management system is used to make a query to the domain name server DNS on the IP security tunnel and obtain the IP address of the network management system fed back by the DNS.

(3) Use an FQDN that includes information about the network management system to make a query to the DNS on the IP security tunnel to obtain the IP address of the network management system.

Step 306: The relay node establishes a connection with the network management system by using the second IP address of the relay node and the IP address of the network management system.

As shown in FIG. 3, the IP connection established between the relay node and the network management system is implemented through the IP security tunnel between the relay node and the security gateway; and the establishment of the IP connection may be initiated by the relay node or by the network management system.

In the method for establishing a connection with a network management system provided by the embodiment of the present disclosure, the relay node obtains the first IP address of the relay node, obtains the IP address of the security gateway by using the first IP address of the relay node, establishes the IP security tunnel with the security gateway, obtains the second IP address of the relay node and the IP address of the network management system used for network management service transmission through the IP security tunnel, and establishes a connection with the network management system by using the second IP address of the relay node and the IP address of the network management system. Consequently, during the process of accessing a network, the relay node implements a connection with the network management system, and the security of the connection and the processing of establishing the connection is ensured. This further ensures that the relay node is capable of downloading necessary configuration parameters from the network management system to perform access and configuration of the relay node.

In the embodiment of the present disclosure, a PDN connection used for network management service transmission is required for establishing the connection between the relay node and the network management system, where the PDN connection is established by a P-GW for serving the relay node and the selection of a P-GW is performed by an MME. A plurality of implementation manners may be used for selecting a P-GW for serving the relay node, which is not limited in the embodiment of the present disclosure. Several examples are provided in the following for a detailed description.

For example, information for instructing the selection of the P-GW for the relay node may be set in the subscription data of the relay node. In this way, when the relay node accesses a network, the MME may select the P-GW according to the subscription data of the relay node, and initiate session establishment request to the selected P-GW. The session establishment request includes an APN. The APN is from the subscription data of the relay node and may include a network management service label so that the P-GW establishes a PDN connection according to the network management service label.

Figure 4:
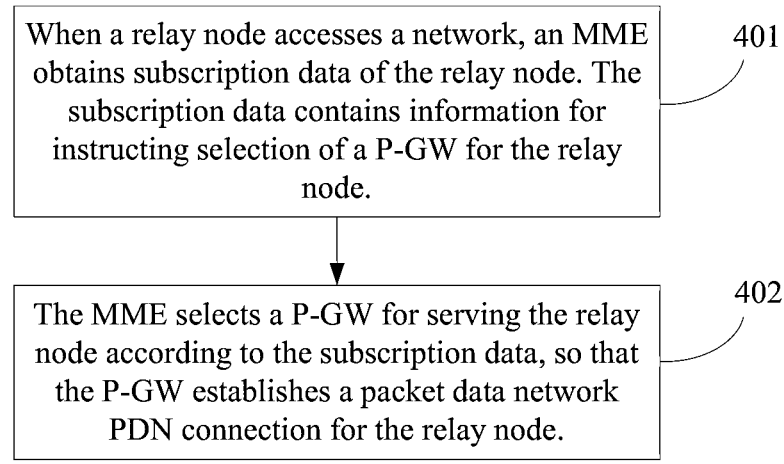
FIG. 4 is a flowchart of a method for establishing a packet data network connection for a relay node according to an embodiment of the present disclosure.

FIG. 4 is a flowchart of a method for establishing a packet data network connection for a relay node according to an embodiment of the present disclosure.

Step 401: When a relay node accesses a network, an MME obtains subscription data of the relay node. The subscription data includes information for instructing selection of a P-GW for the relay node.

The subscription data refers to PDN subscription data, the information for instructing the selection of the P-GW for the relay node. According to different access scenarios of the relay node, the information may have a plurality of manners. For example, the information may be one or any combination of the following:

(1) an IP address which corresponds to a specific P-GW and is set in a P-GW identifier, where the specific P-GW supports establishing an IP connection to a network management system;

(2) a set fully qualified domain name, including a hostname of the P-GW that includes a P-GW information identifier and a public land mobile network (Public Land Mobile Network, PLMN) where the P-GW is located, where the P-GW information identifier includes one or more of the following information: a group identifier, a gateway identifier, a gateway type, and gateway information;

(3) a new label added in the APN network identifier (The APN Network Identifier, APN-NI) that is included in the subscription data, or a new service label added in the APN-NI; and (4) a specific identifier added in the APN operator identifier replacement (The APN Operator Identifier replacement, APN-OI replacement) that is included in the subscription data, where the APN-OI replacement may be a UE-level APN-OI replacement or an APN-level APN-OI replacement.

A process for the MME, in different scenarios, to select a P-GW for the relay node according to the information is described in detail below.

Step 402: The MME selects a P-GW for serving the relay node according to the subscription data, so that the P-GW establishes a packet data network PDN connection for the relay node.

After selecting the P-GW for serving the relay node, the MME initiates a session establishment request to the selected P-GW. The session establishment request includes an APN, and the APN is from the subscription data of the relay node and may include a network management service label so that the P-GW establishes a PDN connection according to the network management service label.

After the selection of the P-GW is performed, the selection of an S-GW may be performed by following an existing criterion. Then, the MME may initiate a session establishment request to the P-GW through the S-PW. The request includes a corresponding APN, and the APN is used for indicating a type of a service transmitted through the PDN connection established by the P-GW.

In the prior art, the P-GW, according to a service label in the APN-NI, identifies the type of the service transmitted through the PDN connection that needs to be established.

In the embodiment of the present disclosure, for the purpose that the P-GW may identify the type of the service transmitted through the PDN connection to be established, a new service label may be defined for the relay node in the APN for indicating that a PDN connection that may be used for network management service transmission is to be established.

It has been mentioned above that, in the embodiment of the present disclosure, the information which is used for instructing the selection of the P-GW for the relay node and is included in the subscription data may have a plurality of implementation manners. The process for the MME, in different scenarios, to select the P-GW for the relay node according to the information is described in detail in the following.

Scenario 1: Supposing that the relay node establishes the PDN connection in phase 1 of the network access of the relay node, an existing process of selecting a P-GW when a UE access a network is used in the process of selecting the P-GW. That is, the MME selects a P-GW for the relay node according to information in the PDN subscription data in a home subscriber server (Home Subscriber Server, HSS). In the prior art, for each subscribed PDN, information provided by the HSS includes:

(1) a P-GW identifier and an access point name (Access Point Name, APN); or (2) an APN and an indication for the APN, where the indication indicates whether it is allowed that a visited PLMN (Visited PLMN, VPLMN) assigns a P-GW or only a home PLMN (Home PLMN, HPLMN) may assign a P-GW; and (3) the HSS further indicates the corresponding subscribed PDN of which APN is the default APN of the UE.

However, because the relay node needs to establish a connection to the network management system, the P-GW selected for the relay node should be capable of supporting IP connectivity for connecting the network management system and be capable of establishing a PDN connection to the network management system for the relay node. Therefore, the P-GW should be a specific P-GW and should be differentiated from other common P-GWs during the selection of the P-GW, and the location of the P-GW is not limited and may be in a core network.

Base on this situation, in the embodiment of the present disclosure, information in the existing PDN subscription data may be modified to include information for instructing selection of a P-GW for the relay node. As a result, when the relay node accesses a network, the MME may directly select a P-GW according to the information in the PDN subscription data. Specifically, information in the P-GW identifier may be modified, and information in the APN may also be modified. The two implementation manners are described in detail in the following:

1. Modify information in the P-GW identifier to have the information for instructing the selection of the P-GW for the relay node included in the P-GW identifier. As a result, when the relay node accesses a network, the MME may directly select a P-GW by using the information in the P-GW identifier, which may specifically include the following implementation manners:

(1) Set a specific IP address in the P-GW identifier in the PDN subscription data. The IP address corresponds to a specific P-GW in the core network. The MME may locate the specific P-GW by using the IP address. That is, when the relay node accesses a network, the MME uses the IP address in the P-GW identifier in the subscription data of the relay node as the address of the P-GW for serving the relay node.

(2) Define a special FQDN in the PDN subscription data. When the relay node access a network, the MME requests, according to the FQDN, an IP address corresponding to the FQDN from the DNS. The IP address is the address of the P-GW for serving the relay node.

The FQDN refers to a hostname plus a full path. The fully qualified domain name may logically accurately indicate where a host is, that is, the fully qualified domain name is a complete presentation form of a hostname. Information included in the fully qualified domain name may specify the location of the host in a domain-name tree.

In the prior art, an FQDN consists of Destination-Host (Destination-Host) and Destination-Realm (Destination-Realm), where:

Destination-Host includes a hostname (hostname) of a target P-GW, meeting the following format: <"topon"|"topoff">.<single-label-interface-name>.<canonical-node-name>, in which, <"topon"|"topoff"> indicates whether to preferably select a P-GW that has a closer topological distance or shares the same address with a service gateway (Service GW, S-GW); <single-label-interface-name> indicates a port type, such as Eth-0 or S8; and <canonical-node-name> indicates description of the P-GW node; and Destination-Realm consists of the following formats:
epc.mnc<MNC>.mcc<MCC>.3gppnetwork.org, in which, mite and mcc indicate which PLMN the P-GW is located in.

For the purpose of differentiating from a P-GW for serving a UE, in the embodiment of the present disclosure, the information for instructing the selection of the P-GW for the relay node may be added in the FQDN of an existing P-GW, so that the MME requests, through the FQDN, a the address of the P-GW to the DNS for serving the relay node. Specifically, the Destination-Host may include a P-GW information identifier. For example, the following one or more identifiers may be included: a group identifier, a gateway identifier, a gateway type, location information, and so on.

For example, in the embodiment of the present disclosure, the FQDN of the P-GW for serving the relay node may be: topon.S5.cluster4relay.net27.example.net; "cluster4relay" in this fully qualified domain name identifies a P-GW group that supports relay node transmission;

may be: topon.Eth-0.gw32.california.west.example.com, in which, "gw32" is a gateway identifier and is used for indicating a specified P-GW (the P-GW is capable of supporting relay node transmission);

may be topon.vip.relay.california.west.example.com, in which, "relay" identifies a special gateway type that is used for supporting a relay node transmission; or may be: topon.S8.gw35.shanghai.pudong.XXroad.example.com, in which, "shanghai.pudong.XXroad" identifies a P-GW that is located at a specified position (the P-GW is capable of supporting relay node transmission).

2. Modify information in the APN to include information for instructing selection of a P-GW for the relay node. As a result, when the relay node accesses a network, the MME may construct an APN-FQDN according to the APN provided by the HSS and then find, through the DNS by using the APN-FQDN, the P-GW for serving the relay node.

It should be noted that a plurality of P-GWs, such as P-GWs of a certain type, may be obtained according to the APN-FQDN. In this situation, the MME may select a proper P-GW among the P-GWs. The specific way to select the P-GW is not limited by the embodiment of the present disclosure and may be determined according to specific application requirements.

In the prior art, an APN consists of the following parts: APN-NI and APN-OI.

The APN-NI defines an external PDN network connected to the P-GW, which may be implemented through the following manners:

the APN corresponds to an FQDN used for selecting a specified gateway general packet radio service (General Packet Radio Service, GPRS) support node (Gateway GPRS Support Node, GPRS support node, GGSN)/P-GW, and the GGSN/P-GW is capable of understanding that the APN is used for accessing a specified service (during establishment of a bearer); or the APN-NI consists of three or more labels and starts with a specified service label; or the APN-NI consists of an independent service label, used for indicating a feature of a service requested by the GGSN/P-GW.

The APN-OI defines where the P-GW is located in an evolved packet system (Evolved Packet System, EPS) network. The APN-OI consists of three labels, meeting the following formats: "mnc<MNC>.mcc<MCC>.gprs", in which, the first label MNC and the second label MCC together uniquely identify a GPRS/EPS PLMN, and the last label must be "gprs". Each operator has a default APN-OI. The default APN-OI may be obtained from an international mobile subscriber identity (International Mobile Subscriber Identity, IMSI).

In addition, the subscription data further includes an APN-OI replacement field, which has the same construction with the default APN-OI. The role that the APN-OI replacement plays is to replace the default APN-OI part during DNS addressing. The APN-OI replacement further includes other additional labels, which are separated with ".".

In the embodiment of the present disclosure, for the purpose of differentiating from selecting a P-GW for a UE, related parameters in the subscription data may be modified, specially including the following implementation manners:

(1) Modify the APN-NI.

In some embodiments, a new label may be defined in the APN-NI, and the label is used for indicating that the P-GW is selected for the relay node. For example, the label may be a relay node identifier (RN, relay), a device identifier (IMSI, IMEI, device number, and so on), a gateway identifier (relayGW), and so on; or a new service label may be defined in the APN-NI, and the service label is used for indicating selection of a P-GW for the relay node, for example, the service label may be OAM.

In some embodiments, the defined new service label may be used only by a specific P-GW, or may also be defined as a service label uniformly used in the entire network, which is not limited by the embodiment of the present disclosure.

(2) Modify the APN-OI Replacement.

The APN-OI replacement is used to replace the default APN-OI part during DNS addressing. In the embodiment of the present disclosure, a special APN-FQDN may also be constructed by modifying the APN-OI replacement, and address information of the P-GW for serving the relay node may be obtained through the APN-FQDN. Specifically, a specified identifier may be added in the APN-OI replacement. The specified identifier is used for indicating selection of a P-GW for the relay node, and the specified identifier may be a relay node identifier (RN, relay), a device identifier (IMSI, IMEI, device number, and so on), a gateway identifier (relayGW), and so on.

In some embodiments, the subscription data of the HSS includes two APN-OI replacement fields, one UE-level APN-OI replacement (on an outer layer) and one APN-level APN-OI replacement (in each piece of PDN subscription data). The two APN-OI replacement fields play the same role. The UE-level APN-OI replacement is applied to all APNs, but the APN-level APN-OI replacement has a higher priority, that is, when the APN-level APN-OI replacement appears, this value needs to be used to construct the APN-FQDN. The APN-OI replacement mentioned in the embodiment of the present disclosure includes the foregoing two situations.

Scenario 2: Suppose that the relay node after detachment initiates a new process of establishing a PDN connection. In this process, the relay node initiates a request for establishing a PDN connection to the MME, and the request includes a requested APN. In this scenario, the relay node may access an MME that does not support a relay node or an MME that can support a relay node. These two situations are described respectively in the following.

1. The relay node accesses an MME that does not support a relay node.

In this situation, the MME determines whether the APN reported by the relay node is the APN in the subscription data of the relay node, and if yes, constructs an APN-FQDN according to the APN reported by the relay node, specifically as follows:

First, the MME uses the APN-OI replacement in the subscription data to replace the APN-OI part in the APN reported by the relay node, and then the MME uses the APN to construct the corresponding APN-FQDN. As a result, the address information of the corresponding P-GW may be obtained through the DNS according to the APN-FQDN.

In some embodiments, the APN-OI replacement in the subscription data is the APN-OI replacement added with a specified identifier. As described above, the specified identifier is used for indicating selection of a P-GW for the relay node, and the specified identifier may be a relay node identifier (RN, relay), a device identifier (IMSI, IMEI, device number, and so on), a gateway identifier (relayGW), and so on.

2. The relay node accesses an MME that supports a relay node.

In this situation, the MME also needs to determine whether the APN reported by the relay node is the APN in the subscription data of the relay node. If yes, the following two manners may be used to select a P-GW for the relay node.

(1) Construct an APN-FQDN according to the APN reported by the relay node, specifically as follows: first, the MME uses the APN-OI replacement in the subscription data to replace the APN-OI part in the APN reported by the relay node; meanwhile, if the MME determines that the relay node accesses a network in phase 2, an eNB identifier or a device identifier indication of a Donor base station for serving the relay node need to be added in the APN and may be specifically added in the APN-NI part or the APN-OI replacement part, and the role is to request the address of the P-GW located on the Donor base station DeNB from the DNS (because it is in phase 2, the MME needs to select a P-GW that is located on the Donor base station for the relay node); then the MME uses the APN to construct the corresponding APN-FQDN. As a result, the address information of the corresponding P-GW may be obtained through the DNS according to the APN-FQDN.

(2) According to that the request for establishing a PDN connection is a request for establishing a new PDN connection initiated by the relay node, the MME may, according to the P-GW selecting result before, directly select a corresponding P-GW for the relay node. The P-GW may be located in a core network or on a DeNB.

In the embodiment of the present disclosure, when information for instructing selection of a P-GW for the relay node in the subscription data of the relay node is set so that the relay node accesses a network, the MME may select a P-GW for serving the relay node according to the subscription data of the relay node, and when initiating a session establishment request to the P-GW, have a network management service label included in an APN of the session establishment request so that the P-GW may establish a PDN connection according to the network management service label.

Figure 5:
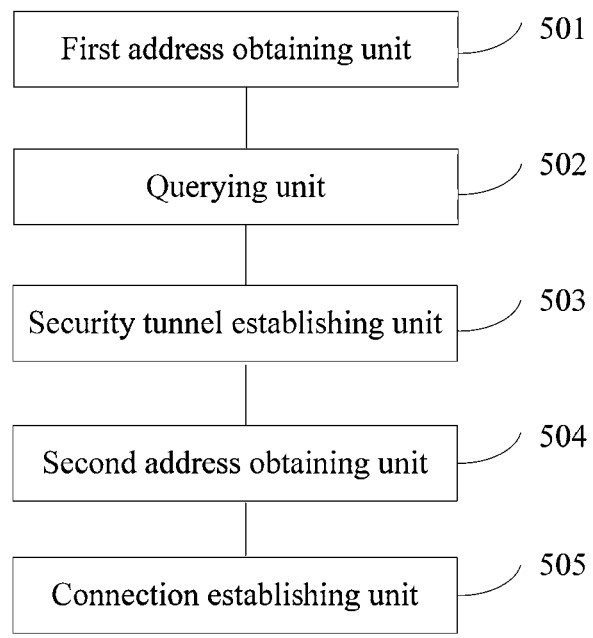
FIG. 5 is a schematic structural diagram of a relay node according to an embodiment of the present disclosure.

Correspondingly, an embodiment of the present disclosure further provides a relay node. FIG. 5 is a schematic structural diagram of a relay node according to an embodiment of the present disclosure.

In this embodiment, the relay node includes: a first address obtaining unit 501, a querying unit 502, a security tunnel establishing unit 503, a second address obtaining unit 504, and a connection establishing unit 505.

The first address obtaining unit 501 obtains a first IP address of the relay node. The querying unit 502 obtains an IP address of a security gateway by using the first IP address of the relay node. The security tunnel establishing unit 503 establishes an IP security tunnel with the security gateway according to the IP address of the security gateway. The second IP address obtaining unit 504 obtains a second IP address of the relay node and an IP address of a network management system through the IP security tunnel. The connection establishing unit 505 establishes a connection with the network management system according to the second IP address of the relay node and the IP address of the network management system.

In some example implementations, the first IP address obtaining unit 501 may obtain the IP address of the relay node through a DHCP process, or obtain the IP address of the relay node through a PDN connection.

The second IP address obtaining unit 504 may initiate a DHCP process to a network where the network management system is located on the IP security tunnel to obtain the IP address of a relay node used for network management service transmission; initiate a DHCP process on the IP security tunnel to obtain the IP address of the network management system; or initiate a DHCP process on the IP security tunnel to obtain a fully qualified domain name FQDN used for indicating the network management system, and then use the fully qualified domain name FQDN used for indicating the network management system to make a query to a domain name server DNS on the IP security tunnel and obtain the IP address of the network management system fed back by the DNS; or use a fully qualified domain name FQDN that includes information about the network management system to make a query to the DNS on the IP security tunnel and obtain the IP address of the network management system fed back by the DNS.

The network management system may be an operator-level network management system, and correspondingly, the IP address of the security gateway is an IP address of a security gateway that is associated with the network where the operator-level network management system is located; or the network management system may also be a device-manufacturer-level network management system, and correspondingly, the IP address of the security gateway is an IP address of a security gateway that is associated with the network where the device-manufacturer-level network management system is located.

The association described herein means that the network where the network management system is located can be accessed only through the gateway. The network where the network management system is located includes: an actual IP (subnet) network where the network management system is located, or an IP (subnet) network that performs interconnection communication with the actual IP (subnet) network where the network management system is located. The network where the network management system is located in the embodiment of the present disclosure is protected by a security gateway.

The network management system may be any one or more of the following identifiers: a device identifier of the relay node, a device manufacturer identifier of the relay node, an operator identifier, and a network management system identifier. The device identifier of the relay node may be the hardware address, the hardware number, the device card number, or the device number. of the relay node.

The relay node in the embodiment of the present disclosure obtains the first IP address of the relay node by using the PDN connection; obtains the IP address of the security gateway by using the IP address of the relay node; establishes the IP security tunnel with the security gateway according to the IP address of the security gateway; obtains the second IP address of the relay node and the IP address of the network management system through the IP security tunnel; and establishes a connection with the network management system by using the second IP address of the relay node and the IP address of the network management system. Consequently, during the process of accessing a network, the relay node implements a connection with the network management system, and the security of the connection is ensured. This further ensures that the relay node is capable of downloading necessary configuration parameters from the network management system to perform access and configuration of the relay node.

Figure 6:
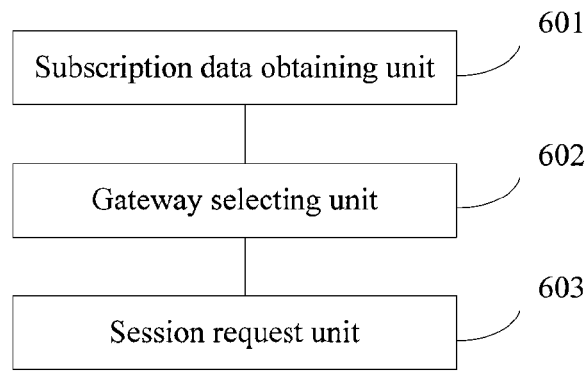
FIG. 6 is a schematic structural diagram of a mobile management network element according to an embodiment of the present disclosure.

Correspondingly, an embodiment of the present disclosure further provides a mobile management network element. FIG. 6 is a schematic structural diagram of the mobile management network element.

In this embodiment, the mobile management network element includes: a subscription data obtaining unit 601 and a gateway selecting unit 602.

The subscription data obtaining unit 601, when a relay node accesses a network, obtains subscription data of the relay node, where the subscription data includes information for instructing selection of a P-GW for the relay node; and the gateway selecting unit 602 select the P-GW for serving the relay node according to the subscription data.

The mobile management network element in the embodiment of the present disclosure may further include a session request unit 603. The session request unit 603 initiates a session establishment request to the P-GW selected by the gateway selecting unit 602. The session establishment request includes an APN in the subscription data of the relay node, and the APN includes a network management service label so that the P-GW establishes a PDN connection according to the network management service label.

In the embodiment of the present disclosure, the information for instructing the selection of the P-GW for the relay node included in the subscription data may have a plurality of implementation manners, for example:

(1) The information for instructing the selection of the P-GW for the relay node may be: an IP address corresponding to a specified P-GW set in a P-GW identifier, where the specific P-GW supports establishment of an IP connection to a network management system.

Correspondingly, in this situation, the gateway selecting unit 602 uses the IP address in the P-GW identifier in the subscription data as an address of the P-GW for serving the relay node.

(2) The information for instructing the selection of the P-GW for the relay node may also be: a set fully qualified domain name, which includes: a hostname of a P-GW that includes a P-GW information identifier and a PLMN where the P-GW is located, where the P-GW information identifier may be any one or more of the following information: a group identifier, a gateway identifier, a gateway type, location information, and so on.

Correspondingly, in this situation, the gateway selecting unit 602 may obtain an IP address of the fully qualified domain name through a DNS, and use the IP address as the address of the P-GW for serving the relay node.

(3) The information for instructing the selection of the P-GW for the relay node may also be: a new label added in an APN-NI included in the subscription data, or a new service label added in the APN-NI.

Correspondingly, in this situation, the gateway selecting unit 602 may, according to the APN-NI and an APN-OI replacement in the subscription data, construct an APN-fully qualified domain name, obtain the IP address of the fully qualified domain name of the APN though the DNS, and use the IP address as the address of the P-GW for serving the relay node.

(4) The information for instructing the selection of the P-GW for the relay node may also be: a specified identifier added in the APN-OI replacement included in the subscription data.

Correspondingly, in this situation, the gateway selecting unit 602 may, according to the APN-NI in the subscription data and the APN-OI replacement, construct a fully qualified domain name of the APN, obtain the IP address of the fully qualified domain name of the APN though the DNS, and use the IP address as the address of the P-GW for serving the relay node.

For the specific implementation of manners of the information for instructing the selection of the P-GW for the relay node, reference may be made to the description above, which is not described herein again.

The mobile management network element in the embodiment of the present disclosure, when a relay node accesses a network, selects a P-GW for serving the relay node according to information for instructing selection of a P-GW for the relay node in subscription data of the relay node, and, when initiating a session establishment request to the P-GW, has a network management service label included in an APN in the session establishment request so that the P-GW may establish a PDN connection according to the network management service label.

Figure 7:
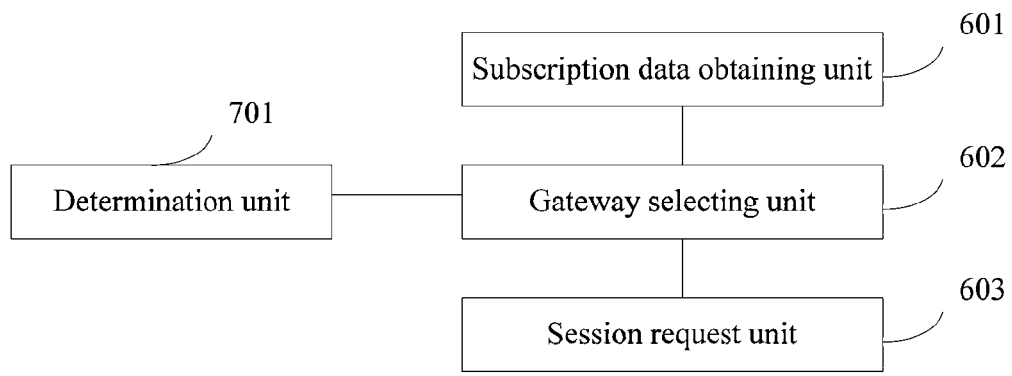
FIG. 7 is another schematic structural diagram of the mobile management network element according to an embodiment of the present disclosure.

FIG. 7 is another schematic structural diagram of the mobile management network element according to an embodiment of the present disclosure.

Compared with the embodiment shown in FIG. 6, in this embodiment, the mobile management network element further includes a determining unit 701, which, when a relay node initiates establishment of a new PDN connection, determines whether an APN reported by the relay node is the APN that the relay node subscribes to.

Correspondingly, in this embodiment, the gateway selecting unit 602 is further configured to: after the determining unit 701 determines that the APN reported by the relay node is the APN that the relay node subscribes to, replace the APN-OI in the APN reported by the relay node with the APN-OI replacement in the subscription data of the relay node, construct a fully qualified domain name of the APN according to the APN reported by the relay node wherein the APN-OI of the APN reported is replaced, obtain the IP address corresponding to the fully qualified domain name of the APN through the DNS, and use the IP address as the address of the P-GW for serving the relay node.

When the relay node initiates the establishment of the new PDN connection, the mobile management network element is capable of, according to the request for establishing a new PDN connection initiated by the relay node, determining that the request is from the relay node instead of a UE. In this situation, the gateway selecting unit 602 further adds an eNB identifier or device identifier indication of a Donor base station for serving the relay node in the constructed fully qualified domain name of the APN so as to request the address of the P-GW located on the Donor base station DeNB from the DNS.

For the situation above, the mobile management network element may further select the P-GW for serving the relay node before. Therefore, in another embodiment of the mobile management network element, the gateway selecting unit 602 may further be configured to: after the determining unit 701 determines that the APN reported by the relay node is the APN that the relay node subscribes to, select the IP address of the P-GW for serving the relay node before.

The mobile management network element in the embodiment of the present disclosure, when a relay node accesses a network, selects a P-GW for serving the relay node according to subscription data of the relay node, and, when initiating a session establishment request to the P-GW, has a network management service label included in an APN in the session establishment request so that the P-GW for serving the relay node may establish a PDN connection according to the network management service label.

Correspondingly, an embodiment of the present disclosure further provides a communication system, including: a network management system and the foregoing relay node, where the relay node is configured to establish a connection with the network management system.

In this communication system, the foregoing mobile management network element is further included.

In this communication system, the foregoing P-GW may be further included for receiving a session establishment request send by the mobile management network element and establishing a PDN connection according to a network management service label included in the session establishment request.

For the specific structures of the relay node and the mobile management network element, reference may be made to the description above, which are not described herein again.

The P-GW may be located in a core network or located on a DeNB.

By employing the network for establishing a connection with a network management system in the embodiment of the present disclosure, in the process of accessing a network, the relay node implements a connection with the network management system. In addition, security of the connection is ensured, and it is further ensured that the relay node is capable of downloading necessary configuration parameters from the network management system to complete the access and configuration of the relay node.

The embodiments of the present disclosure are described in detail above. Although the present disclosure is described with reference to exemplary embodiments, the description of the embodiments is only intended to help understand the method and device of the present disclosure. With respect to the specific implementation manners and application scope, modifications and variations may be made by persons of ordinary skill in the art according to the idea of the present disclosure. Therefore, the specification shall not be construed as a limitation to the present disclosure.

What is claimed is:

1. A method for establishing a packet data network connection for a relay node, comprising:
   receiving, by a mobile management entity (MME), when the relay node accesses a network, subscription data of the relay node, wherein the subscription data comprises information for instructing selection of a packet data network gateway (P-GW) for the relay node; and
   selecting, by the MME, a P-GW for serving the relay node according to the subscription data;
   wherein the method further comprises:
   transmitting, by the MME, a session establishment request to the selected P-GW, wherein the session establishment request comprises an access point name (APN), and the APN comprises a network management service label, wherein the network management service label is used for the P-GW to establish a packet data network (PDN) connection for the relay node;
   wherein the information for instructing the selection of the P-GW for the relay node comprises a fully qualified domain name, wherein the fully qualified domain name comprises a hostname of the P-GW, wherein the hostname includes a P-GW information identifier and a public land mobile network (PLMN) where the P-GW is located; and
   wherein the selecting, by the MME, the P-GW for serving the relay node according to the subscription data comprises:
   receiving, by the MME, an IP address of the fully qualified domain name through a domain name server (DNS) and using the IP address as an address of the P-GW for serving the relay node.

2. The method according to claim 1, wherein the P-GW information identifier comprises one or more of the following information:
   a group identifier, a gateway identifier, a gateway type, and location information.

3. A method for establishing a packet data network connection for a relay node, comprising:
   receiving, by a mobile management entity (MME), when the relay node accesses a network, subscription data of the relay node, wherein the subscription data comprises information for instructing selection of a packet data network gateway (P-GW) for the relay node; and
   selecting, by the MME, a P-GW for serving the relay node according to the subscription data;
   wherein the method further comprises:
   transmitting, by the MME, a session establishment request to the selected P-GW, wherein the session establishment request comprises an access point name (APN), and the APN comprises a network management service label, wherein the network management service label is used for the P-GW to establish a packet data network (PDN) connection for the relay node;
   wherein the information for instructing the selection of the P-GW for the relay node comprises a new label added in an access point name network identifier (APN-NI) that is comprised in the subscription data, or a new service label added in the APN-NI; and wherein the selecting the P-GW for serving the relay node according to the subscription data comprises:

constructing a fully qualified domain name of the APN according to the APN-NI and an access point name operator identifier replacement (APN-OI) replacement in the subscription data; and receiving an IP address of the fully qualified domain name of the APN through the DNS and using the IP address as an address of the P-GW for serving the relay node.

4. A method for establishing a packet data network connection for a relay node, comprising:

receiving, by a mobile management entity (MME), when the relay node accesses a network, subscription data of the relay node, wherein the subscription data comprises information for instructing selection of a packet data network gateway (P-GW) for the relay node; and selecting, by the MME, a P-GW for serving the relay node according to the subscription data;

wherein the method further comprises:

transmitting, by the MME, a session establishment request to the selected P-GW, wherein the session establishment request comprises an access point name (APN), and the APN comprises a network management service label, wherein the network management service label is used for the P-GW to establish a packet data network (PDN) connection for the relay node;

wherein the information for instructing the selection of the P-GW for the relay node comprises a specified identifier added in an access point name operator identifier replacement (APN-OI) replacement included in the subscription data; and wherein the selecting the P-GW for serving the relay node according to the subscription data comprises:

constructing a fully qualified domain name of the APN according to an access point name network identifier (APN-NI) in the subscription data and the APN-OI replacement; and receiving an IP address of the fully qualified domain name of the APN through a domain name server (DNS) and using the IP address as an address of the P-GW for serving the relay node.

5. The method according to claim 4, wherein the APN-OI replacement is a user-equipment-level APN-OI replacement or an APN-level APN-OI replacement.

6. The method according to claim 4, further comprising:

determining, by the MME, when the relay node initiates establishment of a new PDN connection, the APN reported by the relay node is the APN that the relay node subscribes to;

replacing the APN-OI in the APN reported by the relay node with the APN-OI replacement in the subscription data of the relay node and then constructing a fully qualified domain name of the APN according to the APN reported by the relay node wherein the APN-OI of the APN reported is replaced; and receiving an IP address of the fully qualified domain name of the APN through the DNS and using the IP address as the address of the P-GW for serving the relay node.

7. The method according to claim 6, further comprising:

adding an Evolved Node B (eNB) identifier or device identifier of a Donor base station for serving the relay node in the constructed fully qualified domain name of the APN.

8. A mobile management network element, comprising:

a receiver, configured to receive subscription data of a relay node, wherein the subscription data comprises information for instructing selection of a packet data network gateway (P-GW) for the relay node, wherein the information for instructing the selection of the P-GW for the relay node comprises a new label added in the an access point name network identifier (APN-NI) that is comprised in the subscription data, or a new service label added in the APN-NI;

a processor, configured to construct a fully qualified domain name of the APN according to the APN-NI and an access point name operator identifier replacement (APN-OI) replacement in the subscription data;

the receiver, configured to receive an IP (Internet Protocol) address of the fully qualified domain name of the APN though a domain name server (DNS); and the processor, configured to use the IP address as an address of the P-GW for serving the relay node.

9. A mobile management network element, comprising:

a receiver, configured to receive subscription data of a relay node, wherein the subscription data comprises information for instructing selection of a packet data network gateway (P-GW) for the relay node, wherein the information for instructing the selection of the P-GW for the relay node comprises a specified identifier added in an access point name operator identifier replacement (APN-OI) replacement comprised in the subscription data;

a processor, configured to construct a fully qualified domain name of the APN according to an access point name network identifier (APN-NI) in the subscription data and the APN-OI replacement;

the receiver, configured to receive obtain an IP (Internet Protocol) address of the fully qualified domain name of the APN though the DNS; and the processor, configured to use the IP address as an address of the P-GW for serving the relay node.

10. The mobile management network element according to claim 9, further comprising:

the processor, configured to determine, when the relay node initiates establishment of a new PDN connection, an APN reported by the relay node is the APN that the relay node subscribes to; and the processor is further configured to after the processor determines that the APN reported by the relay node is the APN that the relay node subscribes to, replace the APN-OI in the APN reported by the relay node with the APN-OI replacement in the subscription data of the relay node, and construct a fully qualified domain name of the APN according to the APN reported by the relay node wherein the APN-OI of the APN reported is replaced;

the receiver, configured to receive an IP address of the fully qualified domain name of the APN through the DNS; and the processor, configured to use the IP address as the address of the P-GW for serving the relay node.

11. The mobile management network element according to claim 10, wherein:

the processor is further configured to add an Evolved Node B (eNB) identifier or device identifier of a Donor base station for serving the relay node in the constructed fully qualified domain name of the APN.

* * * * *

UNITED STATES PATENT AND TRADEMARK OFFICE
CERTIFICATE OF CORRECTION

| | | |
|---|---|---|
| PATENT NO. | : 9,131,473 B2 | Page 1 of 1 |
| APPLICATION NO. | : 14/036943 | |
| DATED | : September 8, 2015 | |
| INVENTOR(S) | : Wang et al. | |

It is certified that error appears in the above-identified patent and that said Letters Patent is hereby corrected as shown below:

In the Claims

Column 20, line 34, "configured to receive obtain an" should read -- configured to receive an --.

Signed and Sealed this
Eighth Day of March, 2016

Michelle K. Lee
*Director of the United States Patent and Trademark Office*